(12) United States Patent
Birkett et al.

(10) Patent No.: US 10,336,915 B2
(45) Date of Patent: Jul. 2, 2019

(54) ANAEROBICALLY CURABLE COMPOSITIONS

(71) Applicant: HENKEL IP & HOLDING GMBH, Duesseldorf (DE)

(72) Inventors: David Birkett, Co. Kildare (IE); David Mullen, Co. Meath (IE); Ronan Crowley, Limerick (IE)

(73) Assignee: Henkel IP & Holding GmbH, Duesseldorf (DE)

( * ) Notice: Subject to any disclaimer, the term of this patent is extended or adjusted under 35 U.S.C. 154(b) by 0 days.

(21) Appl. No.: 15/813,470

(22) Filed: Nov. 15, 2017

(65) Prior Publication Data
US 2018/0072918 A1    Mar. 15, 2018

Related U.S. Application Data

(63) Continuation of application No. PCT/EP2016/057374, filed on Apr. 4, 2016.

(30) Foreign Application Priority Data

May 15, 2015    (GB) .................... 1508409.8

(51) Int. Cl.

| | | |
|---|---|---|
| B32B 7/12 | (2006.01) | |
| B32B 37/12 | (2006.01) | |
| C09J 4/00 | (2006.01) | |
| C09J 5/00 | (2006.01) | |
| C09J 4/06 | (2006.01) | |
| C09K 5/20 | (2006.01) | |
| C09K 3/10 | (2006.01) | |
| C08F 290/14 | (2006.01) | |
| C08K 5/20 | (2006.01) | |

(52) U.S. Cl.
CPC .................. *C09J 4/00* (2013.01); *B32B 7/12* (2013.01); *B32B 37/12* (2013.01); *C08F 290/147* (2013.01); *C09J 4/06* (2013.01); *C09J 5/00* (2013.01); *C09K 3/1006* (2013.01); *C08K 5/20* (2013.01); *C09J 2433/00* (2013.01); *C09K 2003/1065* (2013.01); *C09K 2200/0625* (2013.01)

(58) Field of Classification Search
None
See application file for complete search history.

(56) References Cited

U.S. PATENT DOCUMENTS

| | | |
|---|---|---|
| 3,218,305 A | 11/1965 | Krieble |
| 3,425,988 A | 2/1969 | Gorman et al. |
| 4,103,081 A | 7/1978 | Repetto |
| 4,180,640 A | 12/1979 | Doherty et al. |
| 4,287,330 A | 9/1981 | Rich |
| 4,321,349 A | 3/1982 | Rich |
| 4,380,613 A | 4/1983 | Nativi |
| 5,605,999 A | 2/1997 | Chu et al. |
| 2003/0171467 A1* | 9/2003 | Kneafsey .................. C09J 4/00 524/257 |
| 2007/0036832 A1 | 2/2007 | Williams |
| 2014/0004353 A1 | 1/2014 | Birkett et al. |
| 2014/0262022 A1 | 9/2014 | Liu et al. |
| 2017/0121639 A1* | 5/2017 | Zhang .................. C11D 3/0015 |

FOREIGN PATENT DOCUMENTS

| | | |
|---|---|---|
| CN | 1232068 | 10/1999 |
| EP | 0282292 A2 | 9/1998 |
| EP | 0943670 | 9/1999 |
| FR | 1581361 | 9/1969 |
| GB | 1249031 A | 10/1971 |

OTHER PUBLICATIONS

R.D. Rich, "Anaerobic Adhesives" in Handbook of Adhesive Technology, 29, 467-79, A. Pizzi and K.L. Mittal, eds., Marcel Dekker, Inc., New York (1994).

Written Opinion of the International Searching Authority, dated Jun. 1, 2016 for International application No. PCT/EP2016/057374, filed Apr. 4, 2016.

* cited by examiner

*Primary Examiner* — Sheeba Ahmed
(74) *Attorney, Agent, or Firm* — Steven C. Bauman

(57) ABSTRACT

The present invention relates to anaerobically curable (meth) acrylate compositions, and stabilizers for same.

26 Claims, 3 Drawing Sheets

ANAEROBICALLY CURABLE COMPOSITIONS

FIELD OF THE INVENTION

The present invention relates to anaerobically curable compositions, methods of bonding using anaerobically curable compositions, assemblies bonded using anaerobically curable compositions and cure products of anaerobically curable compositions.

BACKGROUND TO THE INVENTION

Anaerobically curable compositions generally are well known. See e.g. R. D. Rich, "Anaerobic Adhesives" in *Handbook of Adhesive Technology*, 29, 467-79, A. Pizzi and K. L. Mittal, eds., Marcel Dekker, Inc., New York (1994), and references cited therein. Their uses are legion and new applications continue to be developed.

Anaerobic adhesive systems are those which are stable in the presence of oxygen, but which polymerize in the absence of oxygen. Polymerization is initiated by the presence of free radicals, often generated from peroxy compounds.

Oftentimes anaerobic adhesive systems comprise resin monomers terminated with polymerizable acrylate ester such as methacrylate, ethylacrylate and chloroacrylate esters [e.g., polyethylene glycol dimethacrylate and urethane-acrylates (e.g., U.S. Pat. No. 3,425,988 (Gorman)] derived according to known urethane chemistry. Other ingredients typically present in anaerobically curable adhesive compositions include initiators, such as an organic hydroperoxide for example cumene hydroperoxide, tertiary butyl hydroperoxide and the like, accelerators to increase the rate at which the composition cures, and stabilizers such as quinone or hydroquinone, which are included to help prevent premature polymerization of the adhesive due to decomposition of peroxy compounds.

Desirable cure-inducing compositions to induce and accelerate anaerobic cure may include one or more of saccharin, toluidines, such as N,N-diethyl-p-toluidine ("DEp-T") and N,N-dimethyl-o-toluidine ("DM-o-T"), and acetyl phenylhydrazine ("APH") with maleic acid. See e.g. U.S. Pat. No. 3,218,305 (Krieble), U.S. Pat. No. 4,180,640 (Melody), U.S. Pat. No. 4,287,330 (Rich) and U.S. Pat. No. 4,321,349 (Rich).

Saccharin and APH are used as standard cure accelerator components in anaerobic adhesive cure systems. Indeed, many of the LOCTITE®-brand anaerobic adhesive products currently available from Henkel Corporation use either saccharin alone or both saccharin and APH.

Anaerobically curable adhesive compositions also commonly include chelators such as ethylenediamine tetraacetic acid (EDTA) which are employed to sequester metal ions.

Notwithstanding the state of the art, it would be desirable to provide alternative anaerobically curable adhesive compositions.

SUMMARY OF THE INVENTION

In one aspect, the present invention provides an anaerobically curable composition comprising:
(a) a (meth)acrylate component;
(b) a cure-inducing composition; and
(c) at least one stabilizer.
The stabiliser comprises: at least one $C_6$-$C_{50}$ aliphatic chain, derived from a fatty acid, said stabilizer further comprising at least 2 nitrogen atoms and at least 4 carboxy groups.

Herein, a carboxy group is defined as a carboxylic acid group or a carboxylate group or a group for example having the formula:

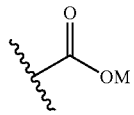

wherein M is H, Li, Na, K, Rb or Cs.

Advantageously, the use of component (c) obviates the necessity to include EDTA. Compositions of the invention are thus more environmentally friendly. Indeed component (c) is readily biodegradable.

The stabilizers of the invention are readily biodegradable. Suitably, the stabilizers of the invention have at least 60% of their carbon content consumed in a 4 week period when biodegradability is assessed according to the Modified Sturm Test (OECD 301B).

The at least one aliphatic chain may be a $C_6$-$C_{50}$ aliphatic chain, for example a $C_6$-$C_{50}$ alkyl chain or a $C_6$-$C_{50}$ alkenyl chain or a $C_6$-$C_{50}$ alkynyl chain.

In one embodiment the at least one $C_6$-$C_{50}$ aliphatic chain is a $C_7$-$C_{22}$ alkyl chain, for example a $C_7$-$C_{12}$ alkyl chain, a $C_{10}$-$C_{14}$ alkyl chain, a $C_{12}$-$C_{16}$ alkyl chain, a $C_{14}$-$C_{18}$ alkyl chain, or a $C_{16}$-$C_{20}$ alkyl chain.

The at least one $C_6$-$C_{50}$ aliphatic chain may be selected from the group of: a $C_8$ alkyl chain, a $C_{10}$ alkyl chain, a $C_{12}$ alkyl chain, a $C_{14}$ alkyl chain, a $C_{16}$ alkyl chain, a $C_{18}$ alkyl chain, a $C_{20}$ alkyl chain or a $C_{22}$ alkyl chain.

The at least one aliphatic chain may have at least one carbon atom substituted with an oxo group.

The at least one $C_6$-$C_{50}$ aliphatic chain can be derived from a vegetable oil or an animal fat.

In one embodiment the stabilizer has only 2 nitrogen atoms.

In one embodiment the stabilizer has 3 or more nitrogen atoms.

In other embodiments the stabilizer has more than 2 nitrogen atoms, for example, in some embodiments the stabilizer has up to 10 nitrogen atoms. Suitably, the stabilizer will have 3 to 8 nitrogen atoms. Having more than 2 nitrogen atoms provides more potential chelating sites within the stabiliser molecule.

At least one nitrogen atom may be covalently bonded to an aliphatic chain derived from a fatty acid, for example, at least one nitrogen atom may be covalently bonded to an alkyl chain derived from a fatty acid, for example via an amide bond. Amide bonds can be easily formed by established methods, thus the stabilizers of the invention can be synthesized in an expedient and efficient manner.

Suitably, at least one nitrogen atom is bonded via an amide bond to at least one aliphatic chain. The amide linkage is sufficiently robust and ensures the stabilizer remains intact at elevated temperature.

Said at least one nitrogen atom can be part of a primary amine, a secondary amine or a tertiary amine group. Preferably, at least one of the nitrogen atoms is part of a tertiary amine group.

The stabilizer may have only 4 carboxy groups. In other embodiments the stabilizer may have from 4 to 12 carboxy groups. For example, the stabilizer may have from 4 to 6 carboxy groups, or from 4 to 8 carboxy groups, or from 4 to 10 carboxy groups, or from 4 to 5 carboxy groups or from 4 to 7 carboxy groups or from 4 to 9 carboxy groups or from 4 to 11 carboxy groups. The stabilizer thus possesses at least one metal chelation site, and can advantageously contain more than one chelation site.

Each of the carboxy groups may be carboxylic acid groups or carboxylate salts, for example, carboxylate salts having an alkali metal counter ion. Each of the carboxy groups may be carboxylate salts having a sodium or potassium counter ion. Suitably, at least one carboxy group will be a carboxylic acid group and at least one carboxy group will be a sodium carboxylate group. Advantageously, stabilizers having sodium or potassium counter ions have increased water solubility in comparison to other metal counter ions, such as magnesium or calcium.

In some embodiments the stabilizer comprises at least one glycinate group. Adornment of nitrogen atoms with glycinate groups, creates chelation sites, wherein, the nitrogen atoms and carboxylate oxygens can adopt suitable arrangements for co-ordinating metals, for example, forming an octahedral chelation site.

The stabilizer may comprise a $C_6$-$C_{50}$ aliphatic chain comprising at least one unsaturated carbon-carbon bond. Thus the oil or fat from which the aliphatic chain, can be derived is not particularly limited, and need not necessarily be solely derived from saturated or unsaturated sources, although it can optionally be.

It will be appreciated that any combinations of stabilizers of the present invention may be used.

In one embodiment the stabilizer comprises a compound having the following formula:

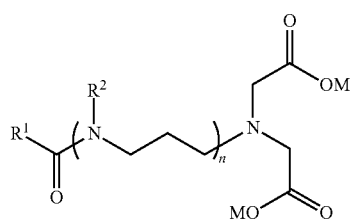

(I)

wherein $R^1$ is a $C_6$-$C_{50}$ aliphatic chain, $R^2$ is H or —$CH_2C(O)OM$,
n is from 2 to 10,
each M, which may be the same or different is independently selected from H, Li, Na, K, Rb or Cs,
and wherein the compound of formula (I) comprises at least 3 nitrogen atoms and at least 4 carboxy groups.

$R^1$ may be a $C_6$-$C_{50}$ alkyl chain, for example; $R^1$ may be a $C_7$-$C_{20}$ alkyl chain, a $C_{10}$-$C_{14}$ alkyl chain; a $C_{12}$-$C_{16}$ alkyl chain; a $C_{14}$-$C_{18}$ alkyl chain; or a $C_{16}$-$C_{20}$ alkyl chain.

$R^1$ may be selected from the group of: a $C_8$ alkyl chain; a $C_{10}$ alkyl chain; a $C_{12}$ alkyl chain; a $C_{14}$ alkyl chain; a $C_{16}$ alkyl chain; a $C_{18}$ alkyl chain; a $C_{20}$ alkyl chain or a $C_{22}$ alkyl chain. Consequently, stabilizers according to the invention are readily biodegradable.

$R^1$—(C=O)— may be derived from a vegetable oil or an animal fat. Thus the $R^1$—(C=O)— may be ubiquitously sourced.

$R^1$ may be optionally substituted with one or more of —$NH_2$, $HNR^2$, or $N(R^2)_2$ wherein each $R^2$ which may be the same or different is independently selected from $C_1$-$C_5C(O)OM$, and each M which may be the same or different is independently selected from H, Li, Na, K, Rb or Cs, for example at least one $R^2$ may be —$CH_2C(O)OH$.

In one embodiment n is from 2 to 4.

The stabilizer may comprise any of sodium cocoamphopolycarboxyglycinate, sodium tallowamphopolycarboxyglycinate or sodium oleylamphopolycarboxyglycinate or combinations thereof.

Suitably, the stabilizer comprises a mixture of compounds having the formula

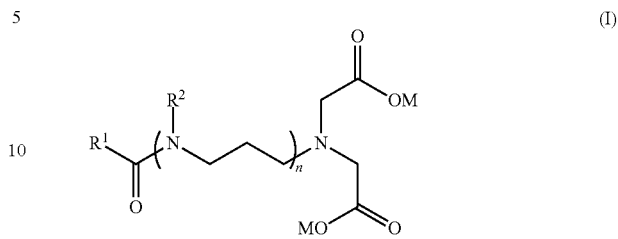

(I)

wherein $R^1$ is a $C_6$-$C_{50}$ aliphatic chain,
$R^2$ is H or —$CH_2C(O)OM$,
n is from 2 to 10,
each M which may be the same or different is independently selected from H, Li, Na, K, Rb or Cs,
and wherein each compound of formula (I) comprises at least 3 nitrogen atoms and at least 4 carboxy groups.

The stabilizer of the invention may ordinarily be present in the compositions in an amount of from about 0.001 percent by weight to about 1 percent by weight, based on the total weight of the composition. For example, the stabilizer of the invention may be present in an amount of from about 0.001 percent by weight to about 0.5 percent by weight, or from about 0.001 percent by weight to about 0.3 percent by weight, or from about 0.001 percent by weight to about 0.06 percent by weight, or from about 0.001 percent by weight to about 0.01, or from about 0.001 to about 0.005 percent by weight based on the total weight of the composition.

Advantageously, the stabilizer of the invention is chosen from those that are readily biodegradable.

The composition of the invention may contain stabilizer compounds having differing $R^1$ groups, stabilizer compounds having differing numbers of nitrogen atoms, differing numbers of carboxy groups, or combinations thereof.

The (meth)acrylate component may be a (meth)acrylate monomer having the formula:

where G may be hydrogen, halogen or alkyl groups having from 1 to about 4 carbon atoms, and $R^8$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, polyurethane, carbonate, amine, amide, sulfur, sulfonate, and sulfone.

Additional (meth)acrylate monomers suitable for use herein include polyfunctional (meth)acrylate monomers, such as, but not limited to, di- or tri-functional (meth) acrylates like polyethylene glycol di(meth)acrylates, tetrahydrofuran (meth)acrylates and di(meth)acrylates, hydroxypropyl (meth)acrylate ("HPMA"), hexanediol di(meth) acrylate, trimethylol propane tri(meth)acrylate ("TMPTMA"), diethylene glycol dimethacrylate, triethylene glycol dimethacrylate ("TRIEGMA"), tetraethylene glycol dimethacrylate, dipropylene glycol dimethacrylate, di-(pentamethylene glycol) dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates, such as ethoxylated bisphenol-A (meth)acrylate ("EBIPMA"), and bisphenol-F mono and di(meth)acrylates, such as ethoxylated bisphenol-F (meth)acrylate.

Still other (meth)acrylate monomers that may be used herein include silicone (meth)acrylate moieties ("SiMA"), such as those taught by and claimed in U.S. Pat. No. 5,605,999 (Chu), the disclosure of which is hereby expressly incorporated herein by reference.

Other suitable monomers include polyacrylate esters represented by the formula

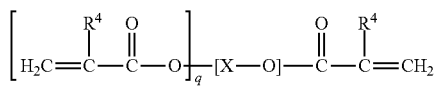

where $R^4$ is a radical selected from hydrogen, halogen or alkyl of from 1 to about 4 carbon atoms; q is an integer equal to at least 1, and preferably equal to from 1 to about 4; and X is an organic radical containing at least two carbon atoms and having a total bonding capacity of q plus 1. With regard to the upper limit for the number of carbon atoms in X, workable monomers exist at essentially any value. As a practical matter, however, a general upper limit is about 50 carbon atoms, such as desirably about 30, and desirably about 20.

For example, X can be an organic radical of the formula:

where each of $Y^1$ and $Y^2$ is an organic radical, such as a hydrocarbon group, containing at least 2 carbon atoms, and desirably from 2 to about 10 carbon atoms, and Z is an organic radical, preferably a hydrocarbon group, containing at least 1 carbon atom, and preferably from 2 to about 10 carbon atoms. Other classes of useful monomers are the reaction products of di- or tri-alkylolamines (e.g., ethanolamines or propanolamines) with acrylic acids, such as are disclosed in French Pat. No. 1,581,361.

Oligomers with (meth)acrylate functionality may also be used. Examples of useful (meth)acrylate-functionalized oligomers include those having the following general formula:

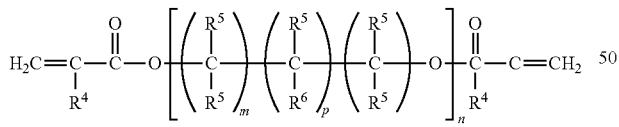

where $R^5$ represents a radical selected from hydrogen, alkyl of from 1 to about 4 carbon atoms, hydroxy alkyl of from 1 to about 4 carbon atoms, or

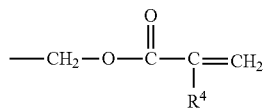

where $R^4$ is a radical selected from hydrogen, halogen, or alkyl of from 1 to about 4 carbon atoms; $R^6$ is a radical selected from hydrogen, hydroxyl, or

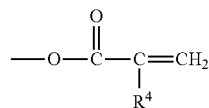

m is an integer equal to at least 1, e.g., from 1 to about 15 or higher, and desirably from 1 to about 8; n is an integer equal to at least 1, e.g., 1 to about 40 or more, and desirably between about 2 and about 10; and p is 0 or 1.

Typical examples of acrylic ester oligomers corresponding to the above general formula include di-, tri- and tetraethyleneglycol dimethacrylate; di(pentamethyleneglycol)dimethacrylate; tetraethyleneglycol diacrylate; tetraethyleneglycol di(chloroacrylate); diglycerol diacrylate; diglycerol tetramethacrylate; butyleneglycol dimethacrylate; neopentylglycol diacrylate; and trimethylolpropane triacrylate.

While di- and other polyacrylate esters, and particularly the polyacrylate esters described in the preceding paragraphs, can be desirable, monofunctional acrylate esters (esters containing one acrylate group) also may be used. When dealing with monofunctional acrylate esters, it is highly preferable to use an ester which has a relatively polar alcoholic moiety. Such materials are less volatile than low molecular weight alkyl esters and, more important, the polar group tends to provide intermolecular attraction during and after cure, thus producing more desirable cure properties, as well as a more durable sealant or adhesive. Most preferably, the polar group is selected from labile hydrogen, heterocyclic ring, hydroxy, amino, cyano, and halo polar groups.

Typical examples of compounds within this category are cyclohexylmethacrylate, tetrahydrofurfuryl methacrylate, hydroxyethyl acrylate, hydroxypropyl methacrylate, t-butylaminoethyl methacrylate, cyanoethylacrylate, and chloroethyl methacrylate.

Another useful class of materials are the reaction product of (meth)acrylate-functionalized, hydroxyl- or amino-containing materials and polyisocyanate in suitable proportions so as to convert all of the isocyanate groups to urethane or ureido groups, respectively.

The so-formed (meth)acrylate urethane or urea esters may contain hydroxy or amino functional groups on the non-acrylate portion thereof. (Meth)acrylate esters suitable for use have the formula:

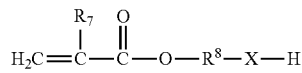

where X is selected from —O— and

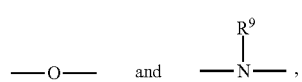

where $R^9$ is selected from hydrogen or lower alkyl of 1 through 7 carbon atoms; $R^7$ is selected from hydrogen, halogen (such as chlorine) or alkyl (such as methyl and ethyl radicals); and $R^8$ is a divalent organic radical selected from alkylene of 1 through 8 carbon atoms, phenylene and naphthylene.

These groups upon proper reaction with a polyisocyanate, yield a monomer of the following general formula:

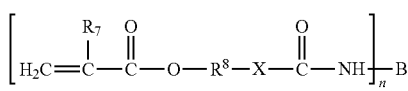

where n is an integer from 2 to about 6; B is a polyvalent organic radical selected from alkyl, alkenyl, cycloalkyl, cycloalkenyl, aryl, alkaryl, alkaryl and heterocyclic radicals both substituted and unsubstituted, and combinations thereof; and $R^7$, $R^8$ and X have the meanings given above.

Depending on the nature of B, these (meth)acrylate esters with urea or urethane linkages may have molecular weights placing them in the oligomer class (such as about 1,000 up to about 5,000) or in the polymer class (such as about greater than 5,000).

Of course, combinations of these (meth)acrylate monomers may also be used.

The (meth)acrylate component should comprise from about 10 to about 98 percent by weight of the composition, such as about 60 to about 95 percent by weight, based on the total weight of the composition.

The inventive compositions may also include other conventional components, such as free radical initiators, free radical accelerators, inhibitors of free radical generation, as well as metal catalysts, such as iron and copper.

A number of well-known initiators of free radical polymerization may be incorporated into the inventive compositions including, without limitation, hydroperoxides, such as CHP, para-menthane hydroperoxide, t-butyl hydroperoxide ("TBH") and t-butyl perbenzoate. Other peroxides include benzoyl peroxide, dibenzoyl peroxide, 1,3-bis(t-butylperoxyisopropyl)benzene, diacetyl peroxide, butyl 4,4-bis(t-butylperoxy)valerate, p-chlorobenzoyl peroxide, cumene hydroperoxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and combinations thereof.

Such peroxide compounds are typically employed in the present invention in the range of from about 0.1 to about 10 percent by weight, based on the total weight of the composition, with about 1 to about 5 percent by weight being desirable.

While compositions described herein are stabilized by virtue of the at least one stabilizer of the invention, and said compositions demonstrate comparable shear strength and stability to control samples, as shown in the examples, compositions of the present invention may further comprise conventional stabilizers. Conventional stabilizers and inhibitors (such as phenols including hydroquinone and quinones) may be employed to control and prevent premature peroxide decomposition and polymerization of the composition of the present invention.

Conventional anaerobic cure-inducing compositions to induce and accelerate anaerobic cure may be included. For example compositions of the present invention may include one or more of saccharin, toluidines, such as N,N-diethyl-p-toluidine ("DE-p-T") and N,N-dimethyl-o-toluidine ("DM-o-T"), and acetyl phenylhydrazine ("APH").

Compositions of the present invention may further comprise thickeners and/or fillers.

The present invention also provides methods of preparing and using the inventive anaerobic adhesive compositions, as well as the reaction products of the compositions.

The compositions of the present invention may be prepared using conventional methods which are well known to those persons of skill in the art. For instance, the components of the inventive composition may be mixed together in any convenient order consistent with the roles and functions the components are to perform in the compositions. Conventional mixing techniques using known apparatus may be employed.

The compositions of this invention may be applied to a variety of substrates to perform with the desired benefits and advantages described herein. For instance appropriate substrates may be constructed from steel, brass, copper, aluminium, zinc, and other metals and alloys, ceramics and thermosets. They are suited to metal to metal bonding.

Advantageously, compositions of the present invention have applications in metal-metal bonding, for example as threadlocking compositions, for securing for example nuts and bolts. The product cures when confined in the absence of air between close fitting metal surfaces. It protects threads from rust and corrosion and prevents loosening from shock and vibration.

Advantageously, compositions of the present invention have applications in gasketing for example by providing gasket seals, such as in gear box assemblies, clutch assemblies, motor mounts etc.

The compositions of the present invention may be utilised in retaining applications for example in any application where one component is retained within another, such as for example where one metal component is to be retained within another. This includes for example retaining bearings within a mounting assembly for example within a hub. The compositions of the invention can be utilised to ensure a mounted component such as a bearing is retained within its mount, for example in a hub.

As with other anaerobic adhesives, the compositions of the present invention are capable of curing in the substantial absence of air.

The present invention also provides a method of using as a chelator in anaerobically curable adhesive compositions, the stabilizer of the present invention as defined above.

Also provides herein is a method of using one or more compounds having the following formula:

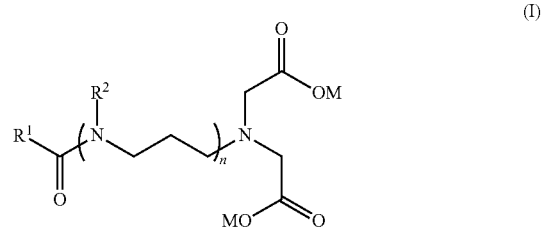

(I)

wherein $R^1$ is a $C_6$-$C_{50}$ an aliphatic chain,
$R^2$ is H or —$CH_2C(O)OM$,
n is from 2 to 10,
each M which may be the same or different is independently selected from H, Li, Na, K, Rb or Cs;
and wherein each compound of formula (I) comprises at least 3 nitrogen atoms and at least 4 carboxy groups;
as a stabilising component in an anaerobically curable adhesive.

The method may typically include the steps of providing a composition comprising:
one or more compounds having the above formula (I);
at least one anaerobically curable monomer; and
a cure inducing component.

Suitably, anaerobically curable monomers and cure inducing components are described above, and may include others known to persons having skill in the art.

The present invention also provides a method of preparing an anaerobically curable adhesive composition comprising the step of mixing together:

(a) a (meth)acrylate component;
(b) an anaerobic cure inducing component; and
(c) at least one stabilizer comprising:

at least one aliphatic chain, derived from a fatty acid, said stabilizer further comprising at least 2 nitrogen atoms and at least 4 carboxy groups.

For example the present invention provides a method of preparing an anaerobically curable composition as described above, wherein the at least one stabilizer is a compound having the following formula:

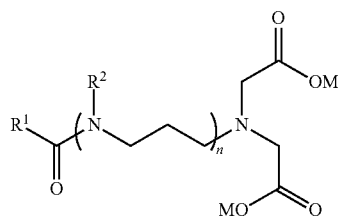
(I)

wherein $R^1$ is a $C_6$-$C_{50}$ aliphatic chain,
$R^2$ is H or —$CH_2C(O)OM$,
n is from 2 to 10,
each M which may be the same or different is independently selected from H, Li, Na, K, Rb or Cs,
and wherein the compound of formula (I) comprises at least 3 nitrogen atoms and at least 4 carboxy groups.

$R^1$ may be a $C_6$-$C_{50}$ alkyl chain, for example, $R^1$ may be a $C_7$-$C_{20}$ alkyl chain, a $C_{10}$-$C_{14}$ alkyl chain, a $C_{12}$-$C_{16}$ alkyl chain, a $C_{14}$-$C_{18}$ alkyl chain, or a $C_{16}$-$C_{20}$ alkyl chain.

$R^1$ may be selected from the group of: a $C_8$ alkyl chain, a $C_{10}$ alkyl chain, a $C_{12}$ alkyl chain, a $C_{14}$ alkyl chain, a $C_{16}$ alkyl chain, a $C_{18}$ alkyl chain, a $C_{20}$ alkyl chain or a $C_{22}$ alkyl chain.

$R^1$—(C=O)— may be derived from a vegetable oil or an animal fat.

$R^1$ may be optionally substituted with one or more of —$NH_2$, $HNR^2$, or $N(R^2)_2$.

In one embodiment n is from 2 to 4.

The stabilizer may comprise any of sodium cocoamphopolycarboxyglycinate, sodium tallowamphopolycarboxyglycinate or sodium oleylamphopolycarboxyglycinate.

Also provided herein is a method of anaerobically curing a (meth)acrylate composition comprising the steps of:

(a) providing a (meth)acrylate composition comprising:—
  (i) (meth)acrylate component;
  (ii) a cure inducing component; and
  (iii) at least one stabilizer comprising:
    at least one aliphatic chain, derived from a fatty acid, said stabilizer further comprising at least 3 nitrogen atoms and at least 4 carboxy groups; and
(b) exposing the (meth)acrylate composition to an anaerobic environment for a time sufficient to cure the composition.

The at least one stabilizer for use in the method may be a compound having the following formula:

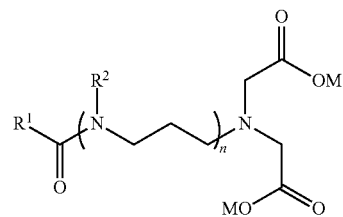
(I)

wherein $R^1$ is a $C_6$-$C_{50}$ aliphatic chain, $R^2$ is H or —$CH_2C(O)OM$, and n is from 2 to 10, M is H, Li, Na, K, Rb or Cs, and wherein the compound of formula (I) comprises at least 3 nitrogen atoms and at least 4 carboxy groups.

$R^1$ may be a $C_6$-$C_{50}$ alkyl chain, for example, $R^1$ may be a $C_7$-$C_{20}$ alkyl chain, a $C_{10}$-$C_{14}$ alkyl chain, a $C_{12}$-$C_{16}$ alkyl chain, a $C_{14}$-$C_{18}$ alkyl chain, or a $C_{16}$-$C_{20}$ alkyl chain.

$R^1$ may be selected from the group of: a $C_8$ alkyl chain, a $C_{10}$ alkyl chain, a $C_{12}$ alkyl chain, a $C_{14}$ alkyl chain, a $C_{16}$ alkyl chain, a $C_{18}$ alkyl chain, a $C_{20}$ alkyl chain or a $C_{22}$ alkyl chain.

$R^1$—(C=O)— may be derived from a vegetable oil or an animal fat.

$R^1$ may be optionally substituted with one or more of —$NH_2$, $HNR^2$, or $N(R^2)_2$.

In one embodiment n is from 1 to 4.

The at least one stabilizer may comprise any of sodium cocoamphopolycarboxyglycinate, sodium tallowamphopolycarboxyglycinate or sodium oleylamphopolycarboxyglycinate.

BRIEF DESCRIPTION OF THE DRAWINGS

Embodiments of the invention will be described, by way of example only, with reference to the accompanying drawings in which.

DETAILED DESCRIPTION OF THE INVENTION

Figure 1:
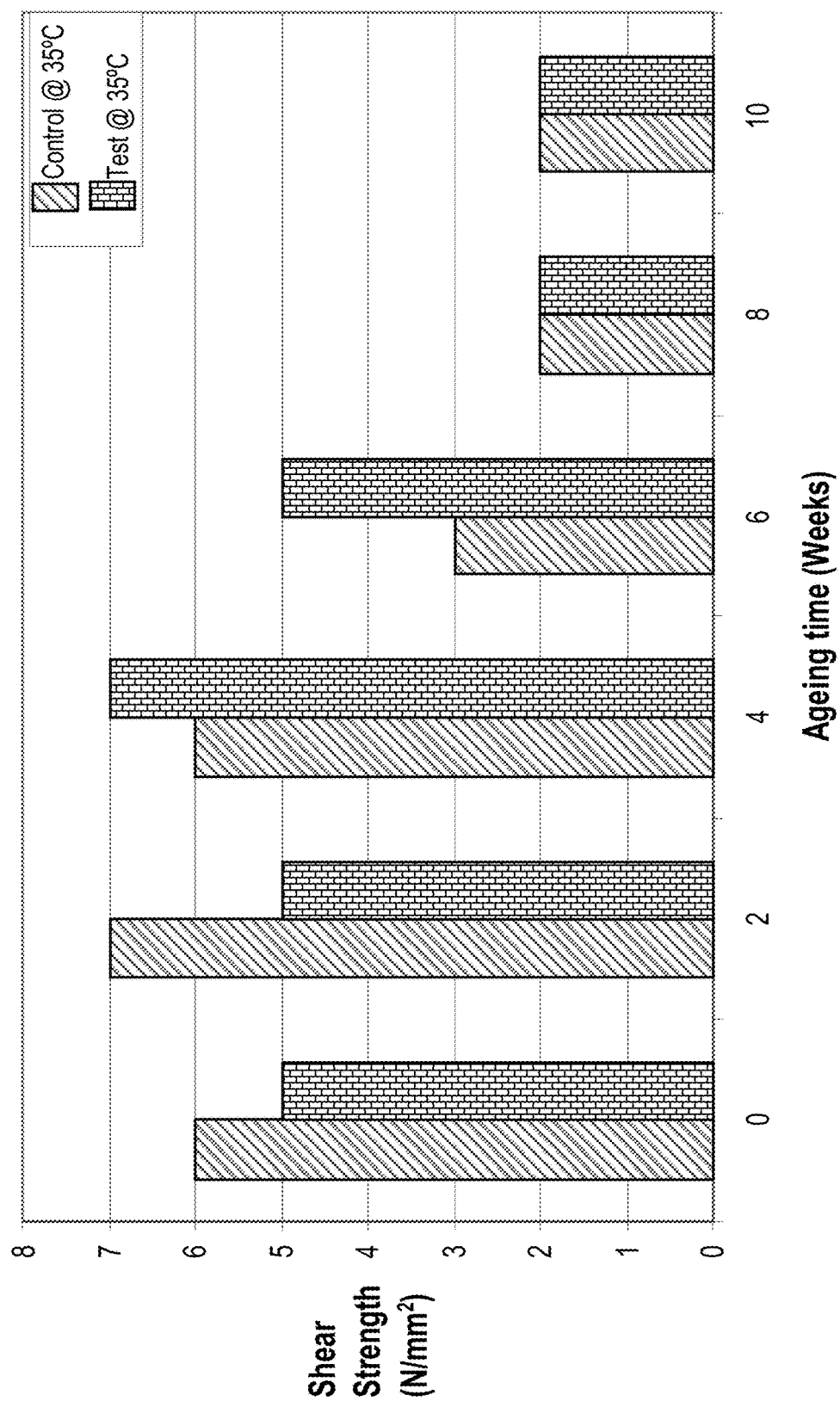
FIGS. 1-3 show the results for shear strength testing of control and test adhesive compositions which were heat aged at 35° C. for up to 10 weeks based on a pin and collar bonded test assembly.

It should be readily apparent to one of ordinary skill in the art that the examples disclosed herein below represent illustrative examples only, and that other arrangements and methods capable of reproducing the invention are possible and are embraced by the present invention.

Stabilizers of the present invention are defined above. Such stabilizers are available under the trade name Ampholak™, from Akzo Nobel.

Stabilisers A-C below contain the following constituents in the noted amounts, as reported by the manufacturer.

| Chemical Name | Composition % (w/w) | Classification |
| --- | --- | --- |
| Stabilizer composition A | AMPHOLAK ™ 7CX/C | |
| Water | 60-100 | Non-Hazardous |
| Sodium Chloride | 0-20 | Non-Hazardous |
| Sodium cocoamphopolycarboxyglycinate | 20-40 | Non-Hazardous |

-continued

| Chemical Name | Composition % (w/w) | Classification |
|---|---|---|
| Stabilizer composition B | AMPHOLAK ™ 7TX | |
| Water | 60-100 | Non-Hazardous |
| Sodium Chloride | 0-20 | Non-Hazardous |
| Sodium Tallowamphopolycarboxyglycinate | 20-40 | N; R50 |
| Stabilizer composition C | AMPHOLAK ™ XO7/C | |
| Water | 60-100 | Non-Hazardous |
| Sodium Chloride | 0-20 | Non-Hazardous |
| Sodium Oleylamphopolycarboxyglycinate | 20-40 | Non-Hazardous |

As a control sample EDTA was employed as stabilizer a 3.5% solution in a 3/1 propylene glycol/water mix.

Advantageously, the above stabilizers act as chelators, sequestering metal ions thereby preventing pre-mature cure of anaerobically curable (meth)acrylate compositions comprising said stabilizers. They therefore provide for greater storage stability.

The pin-and-collar test was used to compare shear strengths of adhesive compositions comprising the stabilizer of the invention to adhesive compositions comprising EDTA. The pin-and-collar test was carried in accordance with ISO 10123.

The composition details are outlined below:—
100 g batches of test composition were prepared from the listed components in the noted amounts as set forth below by weight percent.

| Components | Identity | % weight of total composition |
|---|---|---|
| (meth)acrylate component | polyurethane methacrylate resin | 79.84 |
| | 3-(Trimethoxysilyl)-propyl methacrylate | 0.95 |
| | PEG 200 dimethacrylate | 3.10 |
| | Hydroxylpropyl methacrylate | 2.99 |
| Acrylic acid | Acrylic acid | 8.69 |
| Cure inducing component | Cumene hydroperoxide | 1.95 |
| | 1-Acetyl-2-phenylhydrazine | 0.97 |
| | Saccharin | 0.34 |
| Stabilizers | 5% naphthoquinone solution (w/w in polyethylene glycol dimethacrylate) | 0.20 |
| | 9.2% chelator solution** (w/w) | 0.97 |

**for test samples, the chelator solution was an Ampholak™ solution selected from Ampholak™ 7CX/C, Ampholak™ 7TX, and Ampholak™ XO7/C; for control samples, the chelator solution was an EDTA solution Initially the compositions were prepared by adding with mechanical mixing at room temperature in the appropriate amounts of the components as noted.

The components were mixed for an appropriate period to allow for dissolution and/or dispersion, as the case may be of the solid components. The so-formed formulations were stored for further use by covering the beaker ensuring that an air pocket remained between the surface of the formulation and the cover.

The control sample is the same as the test sample, albeit an EDTA solution replaces the chelator solution of the test sample which comprises the chelators of the invention.

The formulations in accordance with this invention show shelf-stability at room temperature in open containers over time.

The thermal stability of test compositions were compared to control compositions at 82° C. Test compositions comprising the stabilizers of the invention gave the same 82° C. thermal stability as control compositions comprising EDTA at the same weight percent. High thermal stability is particularly desirable, for applications in, for example, engine fittings, whereby elevated temperatures are experienced.

Figure 2:
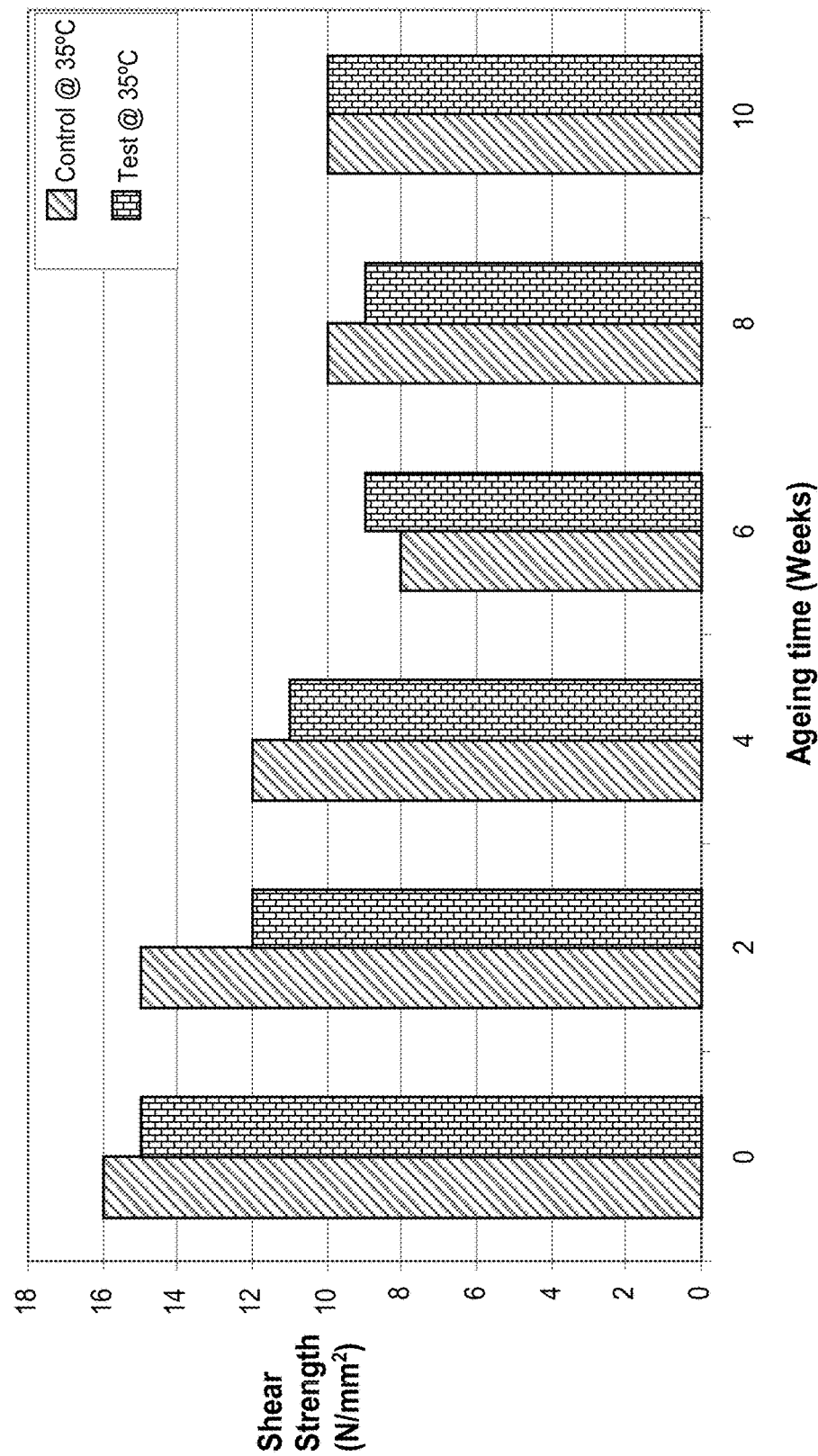
Figure 3:
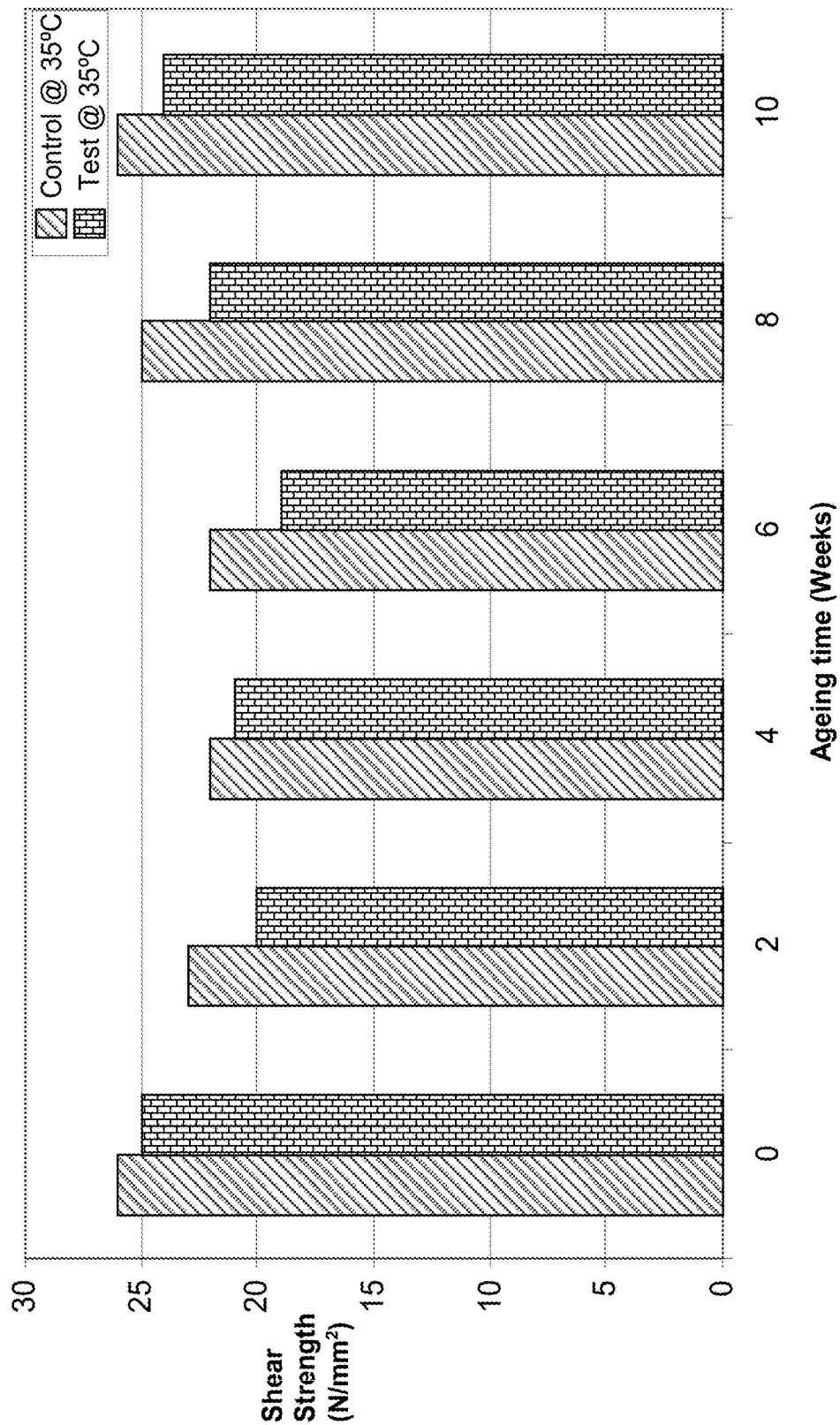

Compositions were heat aged at 35° C. for up to 10 weeks. Control and test adhesive compositions, each aged for a given time period, were applied to the pin-and-collar specimen and allowed to cure for a fixed time period. The shear strength was then assessed and the results are shown in FIGS. 1 to 3. The stabilizer of the present invention present in the test sample for FIGS. 1 to 3 is Ampholak™ X07/C.

FIG. 1 shows the results for shear strength assessment of control and test samples after curing at room temperature for 15 minutes and ageing at 35° C. for the specified number of weeks. The shear strength for both the control composition and the test composition was comparable after 8 weeks.

Shear strength pin-and-collar test results after curing for 15 minutes at room temperature (see FIG. 1) and ageing at 35° C. for the specified number of weeks.

| | Time (Weeks) | | | | | |
|---|---|---|---|---|---|---|
| | 0 | 2 | 4 | 6 | 8 | 10 |
| Control @ 35° C. (N/mm²) | 6 | 7 | 6 | 3 | 2 | 2 |
| Test @ 35° C. (N/mm²) | 5 | 5 | 7 | 5 | 2 | 2 |

FIG. 2 shows the results for shear strength assessment of control and test samples after curing at room temperature for 1 hour and heat ageing for the specified number of weeks. The results clearly indicate comparable shear strength for both the control composition and the test composition.

Shear strength pin-and-collar test results after curing for 1 hour at room temperature and heat ageing for the specified number of weeks (see FIG. 2).

| | Time (Weeks) | | | | | |
|---|---|---|---|---|---|---|
| | 0 | 2 | 4 | 6 | 8 | 10 |
| Control @ 35° C. (N/mm²) | 16 | 15 | 12 | 8 | 10 | 10 |
| Test @ 35° C. (N/mm²) | 15 | 12 | 11 | 9 | 9 | 10 |

FIG. 3 shows the results for shear strength assessment of control and test samples after curing for 24 hours at room temperature and heat ageing at 35° C. for the specified number of weeks. The results clearly indicate comparable shear strength for both the control composition and the test composition.

Shear strength pin-and-collar test results after curing for 24 hours at room temperature and heat ageing at 35° C. for the specified number of weeks (see FIG. 3).

|  | Time (Weeks) | | | | | |
|---|---|---|---|---|---|---|
|  | 0 | 2 | 4 | 6 | 8 | 10 |
| Control @ 35° C. (N/mm²) | 26 | 23 | 22 | 22 | 25 | 26 |
| Test @ 35° C. (N/mm²) | 25 | 20 | 21 | 19 | 22 | 24 |

Desirably, stabilizers having the following formula:

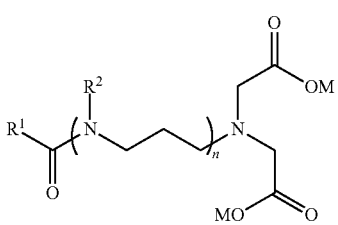

(I)

wherein $R^1$ is a $C_6$-$C_{50}$ aliphatic chain,
$R^2$ is H or —CH$_2$C(O)OM, n is from 2 to 10,
each M which may be the same or different is independently selected from H, Li, Na, K, Rb or Cs,
and wherein the compound of formula (I) comprises at least 3 nitrogen atoms and at least 4 carboxy groups;
proved to be at least as effective chelators as EDTA in the compositions of the present invention.

Compositions comprising at least one of sodium cocoamphopolycarboxyglycinate, sodium tallowamphopolycarboxyglycinate, and/or sodium oleylamphopolycarboxyglycinate are particularly desirable.

Overall, the stabilizer of the present invention is a viable alternative to EDTA as a chelator in anaerobically curable compositions. Advantageously, anaerobically curable adhesive compositions comprising the stabilizer of the present invention, demonstrated comparative shear strengths to compositions wherein EDTA was used as a chelator.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. An anaerobically curable composition comprising:
   (a) a (meth)acrylate component;
   (b) a cure inducing component; and
   (c) at least one stabilizer comprising:
at least one $C_6$-$C_{50}$ aliphatic chain, derived from a fatty acid, said stabilizer further comprising at least 2 nitrogen atoms and at least 4 carboxy groups.

2. An anaerobically curable composition according to claim 1, wherein the at least one $C_6$-$C_{50}$ aliphatic chain is a $C_7$-$C_{20}$ alkyl chain.

3. An anaerobically curable composition according to claim 1, wherein the at least one $C_6$-$C_{50}$ aliphatic chain is a $C_7$-$C_{12}$ alkyl chain.

4. An anaerobically curable composition according to claim 1, wherein the at least one $C_6$-$C_{50}$ aliphatic chain is selected from the group of: a $C_8$ alkyl chain, a $C_{10}$ alkyl chain, a $C_{12}$ alkyl chain, a $C_{14}$ alkyl chain, a $C_{16}$ alkyl chain, a $C_{18}$ alkyl chain, a $C_{20}$ alkyl chain or a $C_{22}$ alkyl chain.

5. An anaerobically curable composition according to claim 1, wherein the at least one $C_6$-$C_{50}$ aliphatic chain is derived from a vegetable oil or an animal fat.

6. An anaerobically curable composition according to claim 1, wherein the stabilizer has only 2 nitrogen atoms.

7. An anaerobically curable composition according to claim 1, wherein the stabilizer has 3 or more nitrogen atoms.

8. An anaerobically curable composition according to claim 1, wherein at least one nitrogen atom is covalently bonded to an aliphatic chain derived from a fatty acid.

9. An anaerobically curable composition according to claim 1, wherein at least one nitrogen atom is covalently bonded to an alkyl chain derived from a fatty acid.

10. An anaerobically curable composition according to claim 1, wherein at least one nitrogen atom is a secondary amine.

11. An anaerobically curable composition according to claim 1, wherein at least one nitrogen atom is a tertiary amine.

12. An anaerobically curable composition according to claim 1, wherein the stabilizer has only 4 carboxy groups.

13. An anaerobically curable composition according to claim 1, wherein the stabilizer comprises a glycinate group.

14. An anaerobically curable composition according to claim 1, wherein the at least one aliphatic chain comprises at least one unsaturated carbon-carbon bond.

15. An anaerobically curable composition according to claim 1, wherein the stabilizer is a compound having the formula:

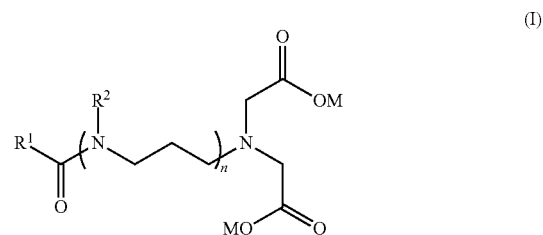

(I)

wherein $R^1$ is a $C_6$-$C_{50}$ an aliphatic chain, $R^2$ is H or —CH$_2$C(O)OM, n is from 2 to 10, each M which may be the same or different is independently selected from H, Li, Na, K, Rb or Cs, wherein the compound of formula (I) comprises at least 3 nitrogen atoms and at least 4 carboxy groups.

16. An anaerobically curable composition according to claim 15, wherein $R^1$ is a $C_6$-$C_{20}$ alkyl chain.

17. An anaerobically curable composition according to claim 15, wherein $R^1$ is optionally substituted with one or more of —NH$_2$, HNR$^2$, or N(R$^2$)$_2$.

18. An anaerobically curable composition according to claim 15 wherein n is from 2 to 4.

19. An anaerobically curable composition according to claim 1, wherein the stabilizer is sodium cocoamphopolycarboxyglycinate.

20. An anaerobically curable composition according to claim 1, wherein the stabilizer is sodium tallowamphopolycarboxyglycinate.

21. An anaerobically curable composition according to claim 1, wherein the stabilizer is sodium oleylamphopolycarboxyglycinate.

22. An anaerobically curable composition according to claim 1, wherein the methacrylate component is a (meth)acrylate monomer having the formula:

wherein G may be hydrogen, halogen or alkyl groups having from 1 to 4 carbon atoms, and $R^8$ may be selected from alkyl, cycloalkyl, alkenyl, cycloalkenyl, alkaryl, aralkyl or aryl groups having from 1 to 16 carbon atoms, any of which may be optionally substituted or interrupted as the case may be with silane, silicon, oxygen, halogen, carbonyl, hydroxyl, ester, carboxylic acid, urea, urethane, polyurethane, carbonate, amine, amide, sulfur, sulfonate, and sulfone.

23. The cure product of a composition according to claim 1.

24. A method of bonding together two substrates comprising the steps of:
applying a (meth)acrylate composition according to claim 1, to at least one of the substrates and mating together the substrates for a time sufficient to permit an adhesive bond to form from the (meth)acrylate composition between the mated substrates.

25. An assembly comprising two substrates bonded together by the cure product of composition according to claim 1.

26. A method of anaerobically curing a (meth)acrylate composition comprising the steps of:
(a) providing a (meth)acrylate composition comprising:
(i) a (meth)acrylate component;
(ii) a cure inducing component; and
(iii) at least one stabilizer comprising:
at least one aliphatic chain, derived from a fatty acid, said stabilizer further comprising at least 2 nitrogen atoms and at least 4 carboxy groups; and
(b) exposing the (meth)acrylate composition to an anaerobic environment for a time sufficient to cure the composition.

* * * * *